United States Patent [19]
Sawada

[11] Patent Number: 5,848,046
[45] Date of Patent: Dec. 8, 1998

[54] DISK APPARATUS HAVING SIGNAL PROCESSING UNIT

[75] Inventor: Masaru Sawada, Kasugai, Japan

[73] Assignee: Fujitsu Limited, Kanagawa, Japan

[21] Appl. No.: 869,742

[22] Filed: Jun. 5, 1997

[30] Foreign Application Priority Data

Aug. 5, 1996 [JP] Japan .................................. 8-205807

[51] Int. Cl.$^6$ ...................................................... G11B 7/00
[52] U.S. Cl. .............................................. 369/124; 369/59
[58] Field of Search ................................ 369/59, 60, 124, 369/48, 47; 360/39, 51, 55

[56] References Cited

U.S. PATENT DOCUMENTS

4,651,277  3/1987  Sakaji ....................................... 364/221

*Primary Examiner*—Nabil Hindi
*Attorney, Agent, or Firm*—Nikaido Marmelstein Murray & Oram LLP

[57] ABSTRACT

A signal processing circuit converts a serial analog signal, obtained by sequentially reading data recorded on a disk by a head, to a parallel digital signal to be output. The signal processing circuit also converts an externally input parallel digital signal to a serial analog signal at the time of recording data on the disk and sends the analog signal to the head. The signal processing circuit comprises a converter that converts the serial analog signal of data read from the disk to a serial digital signal and converts the parallel digital signal of externally input data to an analog signal in order to send the analog signal to the head. A shift register converts the serial digital signal received from the converter to a parallel digital signal in a data read mode and converts the parallel digital signal externally input to a serial digital signal to send the serial digital signal to the converter in a data write mode. A processor operates faster than the disk access speed to perform a predetermined reading process on the parallel digital signal received from the shift register to send out the resultant signal and to perform a predetermined writing process on the parallel digital signal externally input to send the resultant signal to the shift register. A program memory, connected to the processor, stores programs associated with the reading process and writing process that are performed by the processor.

16 Claims, 10 Drawing Sheets

DISK APPARATUS HAVING SIGNAL PROCESSING UNIT

BACKGROUND OF THE INVENTION

The present invention relates to a disk apparatus, and, more particularly, to a disk apparatus equipped with a signal processing unit for processing data at the time of recording or reproducing the data on or from a disk.

While efforts are being made to increase the memory capacity of magnetic disk apparatuses, there is a demand to make them more compact. There is also a demand for an improvement in the data reading/writing speed. Different specifications are set for different users for the systems of processes, such as error correction and coding, which are executed in reading/writing data with respect to disk apparatuses. It is therefore preferable that disk apparatuses are able to easily cope with various modifications of the specifications while meeting the demand for compactness.

Figure 1:
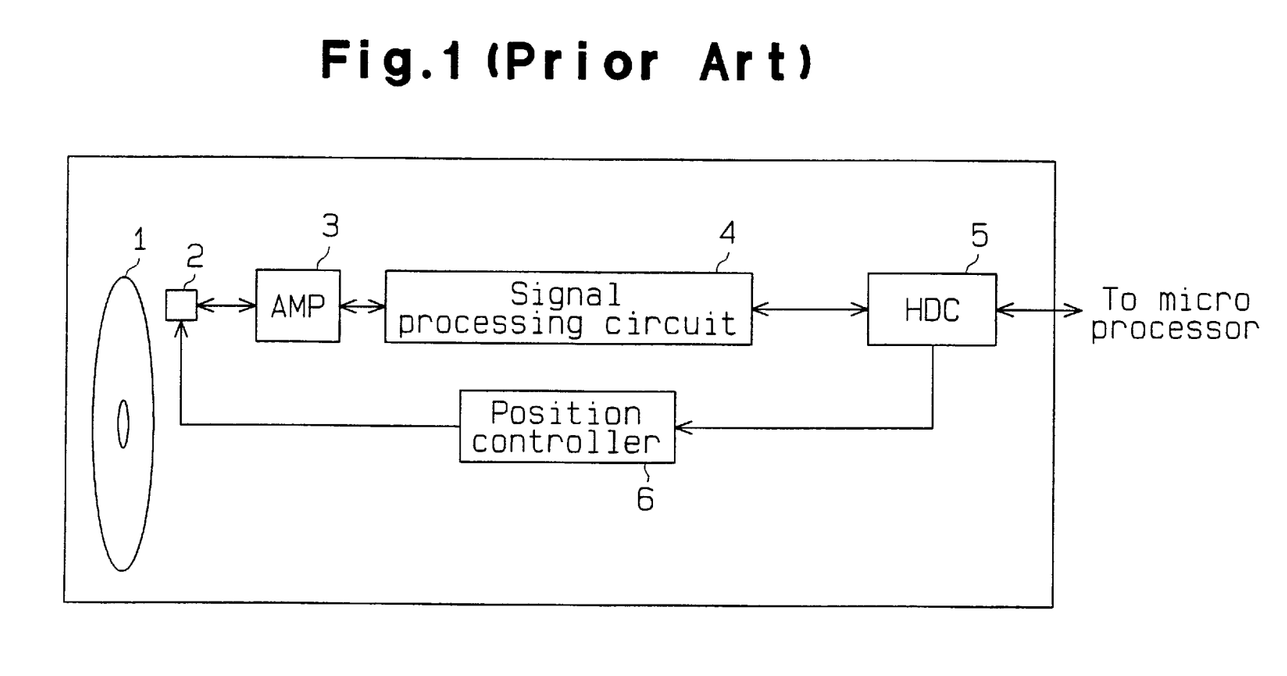
FIG. 1 is a schematic block diagram of one conventional magnetic disk apparatus.

FIG. 1 is a schematic block diagram of a conventional magnetic disk apparatus. Data recorded on a disk 1 is sequentially read by a head 2 and is then sent to an amplifier 3. The amplifier 3 amplifies analog data read by the head 2 and sends the amplified data to a signal processing circuit 4. The signal processing circuit 4 performs signal processing like filtering or decoding on the input analog signal to convert it to parallel data and then sends the parallel data to a hard disk controller (HDC) 5.

The hard disk controller 5 builds up the input data in units of sectors each having a predetermined number of bytes and performs processing, such as error correction using, for example, an ECC (Error Correcting Code) on the data sector by sector. The hard disk controller 5 converts the processed data based on a predetermined communication system and then sends the converted data to a micoro processor (not shown).

In writing data on the disk 1, data output from the micoro processor is subjected to signal processing like affixing of ECC data by the hard disk controller 5, and the processed data is sent to the signal processing circuit 4. The signal processing circuit 4 executes signal processing such as coding on the input data, affixes servo information to the processed data, converts the resultant data to serial data, and sends it out as an analog signal. This analog signal is amplified by the amplifier 3 to be written on the disk 1 by the head 2.

Based on the servo information recorded on the disk 1, the signal processing circuit 4 generates a clock signal necessary for setting a data reading timing and detects the position at which reading of data starts. The hard disk controller 5 detects the position of the head 2 based on the servo information in the data received from the signal processing circuit 4. Then, the hard disk controller 5 controls a position controller 6 to locate the head 2 at a position corresponding to the desired target track for data reading or writing.

Figure 2:
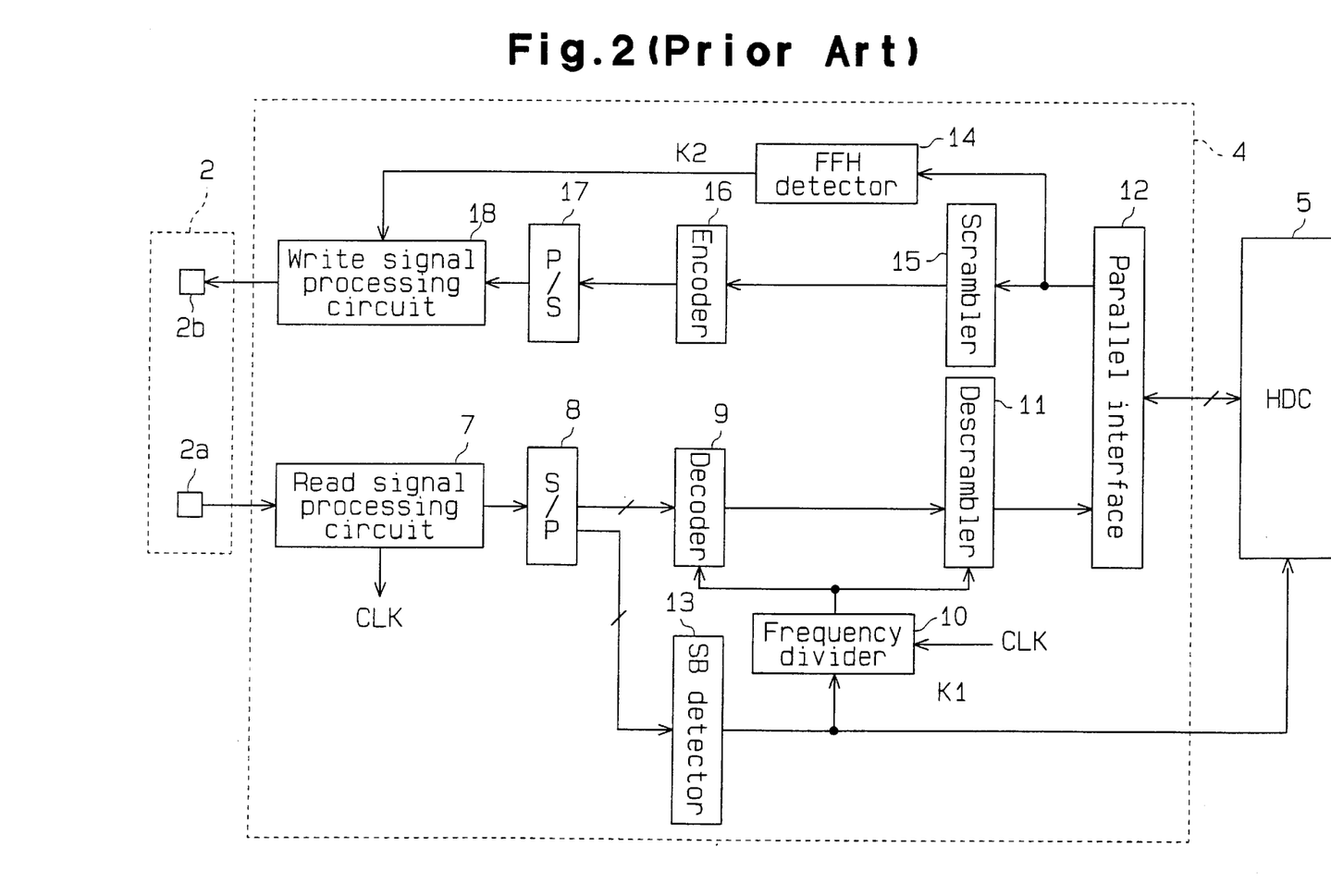
FIG. 2 is a schematic block circuit diagram of a conventional signal processing circuit.

FIG. 2 is a block circuit diagram of the conventional signal processing circuit 4. The head 2 comprises a read head 2a and a write head 2b. The signal processing circuit 4 is provided with a read signal processing circuit 7 and a write signal processing circuit 18 in association with both heads 2a and 2b. In FIG. 2, the amplifier 3 located between the head 2 and the signal processing circuit 4 is omitted.

Data stored on the disk 1 is read and converted to an analog signal by the read head 2a, and the analog signal is sent to the read signal processing circuit 7 of the signal processing circuit 4. The read signal processing circuit 7 performs processing like filtering on the analog signal, which is read by the read head 2a, to remove noise and converts the analog signal to a digital signal (serial data) of "0" or"1" in a predetermined manner (e.g., the peak detection). The read signal processing circuit 7 sequentially sends the digital signal to a serial-parallel (S/P) converter 8. The read signal processing circuit 7 incorporates, for example, a PLL (Phase-Locked Loop) circuit, which generates a clock signal CLK synchronous with the input analog signal.

The S/P converter 8 converts the serial data sequentially sent from the read signal processing circuit 7 to parallel data having a predetermined number of bits and sends the parallel data to a decoder 9. The decoder 9 operates synchronously with a frequency-divided clock signal that is acquired by frequency-dividing the clock signal CLK by a frequency divider 10. The decoder 9 decodes the input data in a predetermined manner and sends the decoded data to a descrambler 11. The descrambler 11 descrambles the input data. The descrambling of data corresponds to data scrambling that is performed by a scrambler 15, to be discussed later, and is executed to positively generate the clock signal CLK in the PLL circuit in the read signal processing circuit 7.

When data recorded on the disk 1 comprises consecutive zeros or ones, if this data is continuously read, the obtained analog signal becomes monotonous. This disables the phase-locking by the PLL circuit so that a clock signal synchronous with the analog signal to be output cannot be generated. In this respect, data has previously been written on the disk 1 in such a way as to avoid consecutive zeros or ones, and such processing is called scrambling. The descrambler 11 restores the scrambled data to the original data. The descrambled data is sent via a parallel interface 12 to the hard disk controller 5.

Parallel data output from the S/P converter 8 is input to a synchronization byte (hereinafter referred to sync byte (SB)) detector 13. The SB detector 13, in which a predetermined pattern has been previously stored, compares the predetermined pattern with 1-byte data coming from the S/P converter 8. When the read data matches that pattern, the SB detector 13 determines that the read data is a sync byte and sends an SB detection signal K1 to the hard disk controller 5.

Figure 10:
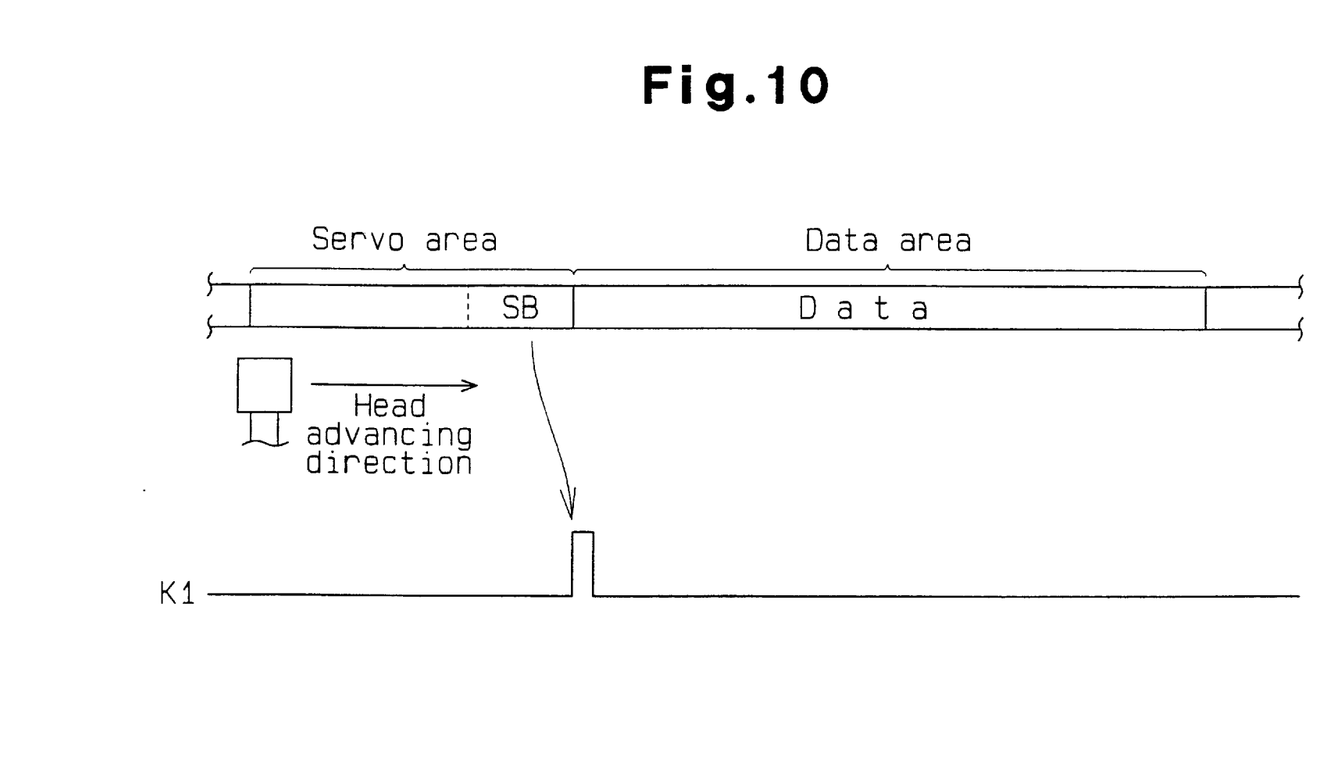
FIG. 10 is a conceptual diagram illustrating a reading operation.

As shown in FIG. 10, each sector of the disk 1 includes a servo area and a data area. Recorded in the servo area are data such as a training pattern or a preamble pattern and the sync byte SB at the end in the advancing direction of the head 2. Recorded in the data area are various kinds of data and ECC data for those various data.

The head 2 reads data in the data area following the sync byte SB. It is therefore possible to read necessary data by validating data following the sync byte SB after the sync byte SB is detected by the SB detector 13.

In writing data on the disk 1, parallel data from the hard disk controller 5 is input via the parallel interface 12 to a control code detector 14. The control code detector 14 compares the input parallel data with a preset control code (e.g., FFH (a hexadecimal code)) and outputs a detection signal K2 corresponding to the comparison result. When the input parallel data is a control code, the write signal processing circuit 18 records individual pieces of information in the servo area on the disk 1 based on the detection signal K2.

When data to be written in the data area is input, it is scrambled by the scrambler 15 to be output to an encoder 16. The encoder 16 encodes the input data according to a predetermined manner and sends the encoded data to a parallel-serial (P/S) converter 17. The P/S converter 17 converts the input parallel data to serial data, which is in turn sent to the write signal processing circuit 18.

The write signal processing circuit 18 subjects the serial data from the P/S converter 17 to a predetermined modulation to convert it to an analog signal and sends the analog signal out. Based on this analog signal, the write head 2b records the data on the disk 1.

The format of data to be recorded on the disk 1 is set individually by the user who uses the disk apparatus. When one wants to use a CRC (Cyclic Redundancy Check) in place of an ECC for error correction or to alter the encoding/decoding system, for example, the signal processing circuit 4 should be designed specifically to cope with such a signal processing system. This necessitates a troublesome preparation of disk apparatuses designed for different systems to be employed.

To ensure a common mechanism for disk apparatuses employing different signal processing systems, the signal processing circuit 4 may be designed to cope with all the expected systems and selectively use them. This scheme inevitably leads to an increase in the circuit scale of the signal processing circuit 4, which makes it difficult to achieve compactness.

SUMMARY OF THE INVENTION

Accordingly, it is a primary objective of the present invention to provide a signal processing circuit that is compact and can easily cope with various specifications and a disk apparatus equipped with this signal processing circuit.

To achieve this object, a disk apparatus embodying this invention comprises a signal processing circuit for converting a serial analog signal, obtained by sequentially reading data recorded on a disk by a head, to a parallel digital signal to be output, and converting an externally input parallel digital signal to a serial analog signal, at the time of recording data on the disk, and outputting the analog signal to the head. The signal processing circuit includes a converter, a shift register, a processor and a program memory. The converter converts the serial analog signal of data read from the disk to a serial digital signal, and converts the parallel digital signal of externally input data to an analog signal, then sends the analog signal to the head. The shift register converts the serial digital signal received from the converter to a parallel digital signal in a data read mode, and converts the parallel digital signal externally input to a serial digital signal, then sends the serial digital signal to the converter in a data write mode.

The processor operates faster than a disk access speed to perform a predetermined reading process on the parallel digital signal received from the shift register for sending out the resultant read signal, and to perform a predetermined writing process on the parallel digital signal externally input for sending the resultant write signal to the shift register. The program memory, connected to the processor, stores programs associated with the reading process and writing process that are performed by the processor.

Therefore, the alteration of the format of data to be recorded on a disk, if such is needed, can easily be handled by changing the read program and the write program stored in the program memory. Because the reading process and writing process can be executed by the common shift register and processor, the overall disk apparatus is compact.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will now be described with reference to the accompanying drawings. To avoid a redundant description, like or same reference numerals as used for the prior art are given to those components that are like or the same as the corresponding components of this embodiment.

Figure 3:
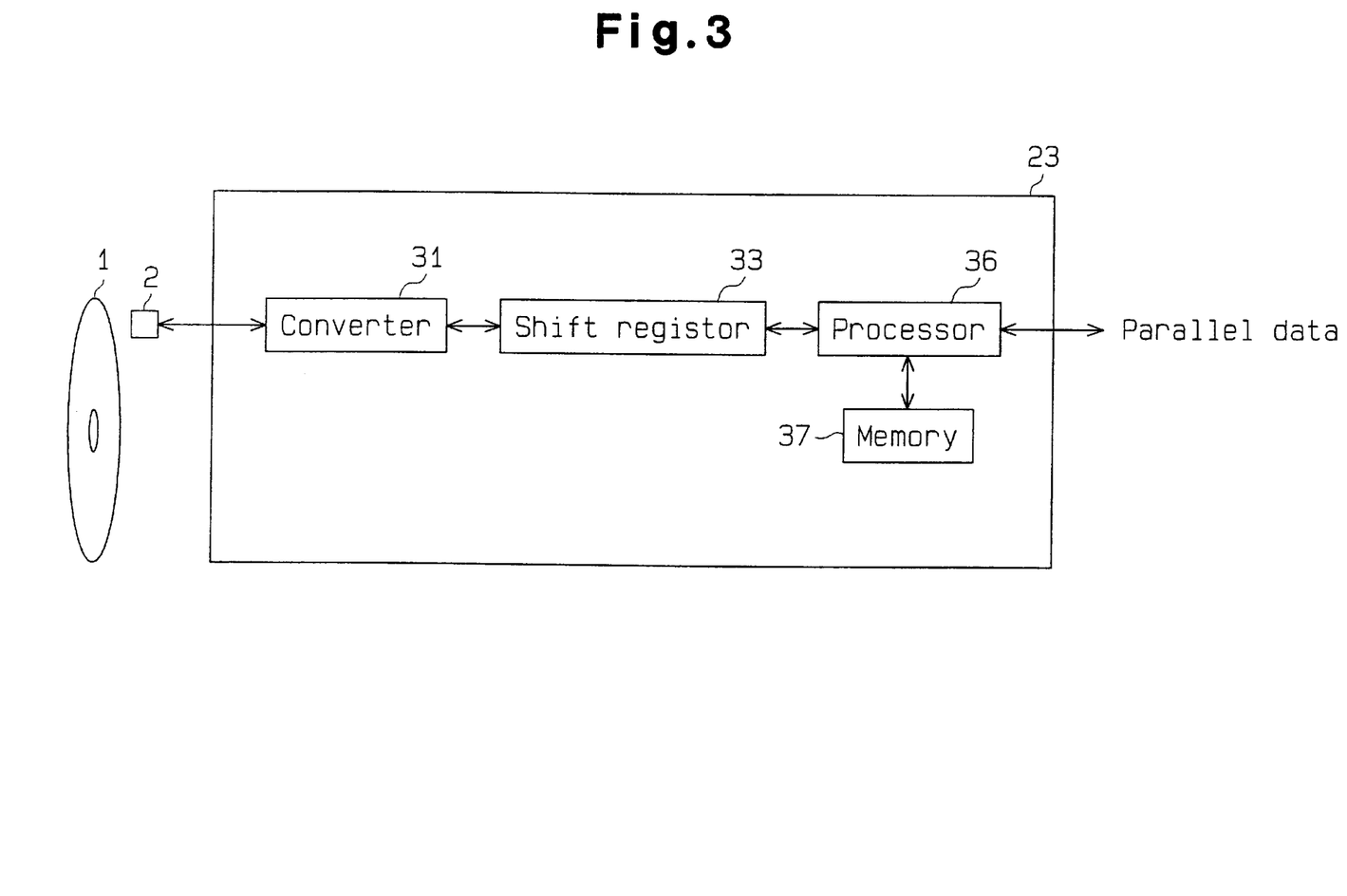
FIG. 3 is a schematic diagram for explaining the principle of this invention.

FIG. 3 presents a schematic diagram for explaining the principle of this invention. An analog signal obtained by sequentially reading data with a head 2, recorded on a disk 1, is input to a converter 31 in a signal processing circuit 23. The converter 31 converts the analog signal coming from the head 2 to a serial digital signal and sends it to a shift register 33.

The shift register 33 converts the serial digital signal from the converter 31 to a parallel digital signal and sends it to a processor 36. The processor 36 operates faster than the speed of accessing the disk 1 to perform a predetermined reading process on the parallel data output from the shift register 33 based on a read program stored in a program memory 37 and sends out the resultant data.

The processor 36 performs a predetermined writing process on externally input parallel data in a data write mode based on a write program stored in the program memory 37 and sends the resultant data to the shift register 33. In the write mode, the shift register 33 converts the parallel digital signal from the processor 36 to a serial digital signal and sends it to the converter 31. The converter 31 converts the input digital signal to an analog signal and sends it out. The head 2 writes data on the disk 1 based on the analog signal.

When the alteration of the format of data to be recorded on the disk 1 is needed, such alteration can easily be accomplished by changing the read program and the write program stored in the program memory 37 accordingly. Since the reading process and writing process can be executed by the common shift register 33 and processor 36, the disk apparatus can be made compact.

Figure 4:
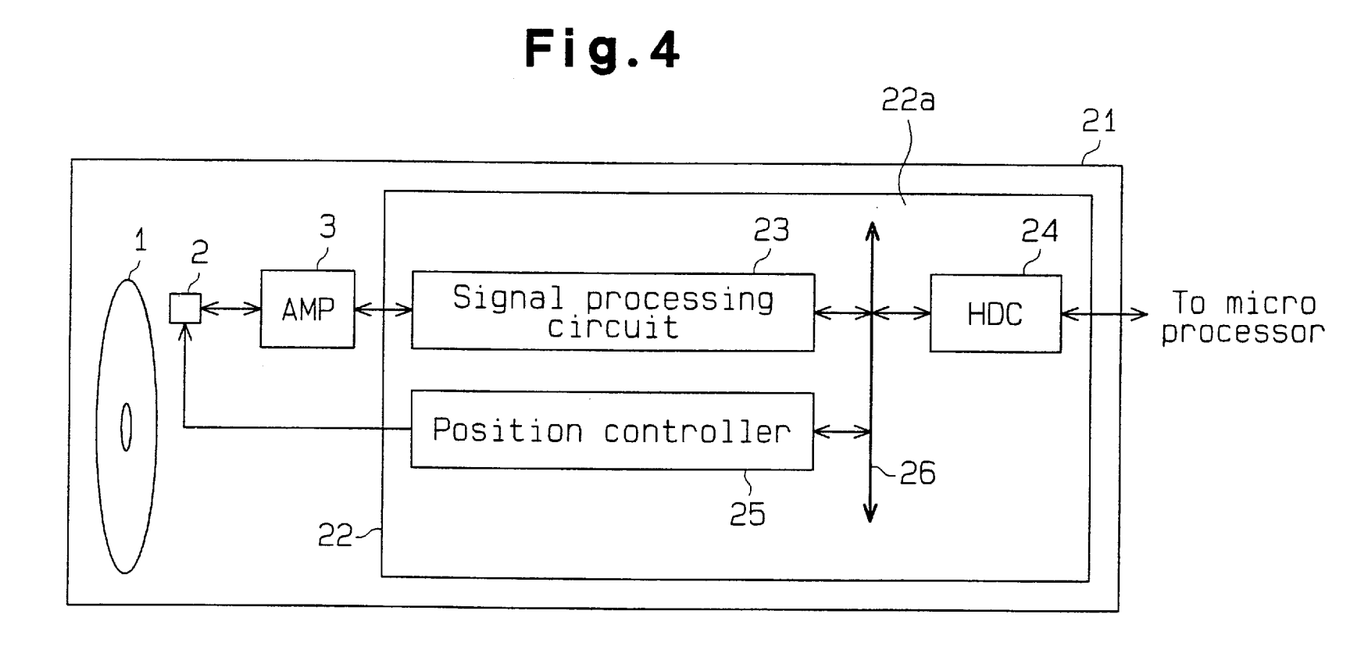
FIG. 4 is a schematic block diagram of a magnetic disk apparatus according to one embodiment of this invention.

As shown in FIG. 4, a magnetic disk apparatus 21 according to this embodiment is provided with the disk 1. Data recorded on that disk 1 is read by the head 2 and is then sent to an amplifier 3. The amplifier 3 amplifies the analog data read by the head 2 and sends the amplified data to a read/write circuit 22. The read/write circuit 22 converts the analog signal sequentially input from the head 2 to a parallel digital signal and sends the converted digital signal to a micoro processor (not shown).

In recording data on the disk 1, a parallel digital signal is sent to the read/write circuit 22 from the micoro processor. The read/write circuit 22 converts the input digital signal to a serial analog signal, which is in turn sequentially written on the disk 1 by the head 2.

The read/write circuit 22 includes a signal processing circuit 23, a hard disk controller (HDC) 24 and a position controller 25. The read/write circuit 22 has, for example, a single board 22a on which the individual circuits 23–25 each constituted by a single chip semiconductor device are mounted. The individual circuits 23–25 are mutually connected by a bus 26 laid on the board 22a.

The signal processing circuit 23 receives an analog signal amplified by the amplifier 3. A control signal from the hard disk controller 24 is also input to the signal processing circuit 23 via the bus 26. This control signal designates one of the operation modes of the signal processing circuit 23, which include a read mode for reading recorded data from the disk 1 and a write mode for recording data on the disk 1.

The signal processing circuit 23 performs signal processing like filtering or decoding on the analog signal input in the read mode to convert the analog signal to parallel data in units of bytes, each of which comprises a predetermined number of bits. The signal processing circuit 23 sends the parallel data, byte by byte, to the hard disk controller 24 via the bus 26. The hard disk controller 24 assembles the input parallel data in units of sectors, each of which comprises a predetermined number of bytes, and performs processing like error correction using, for example, an ECC on the assembled data sector by sector. Thereafter, the hard disk controller 24 converts the processed data in units of sectors based on a predetermined communication system and then sends the converted data to a micoro processor (not shown).

In writing data on the disk 1, on the other hand, data is input to the hard disk controller 24 from the external micoro processor. The hard disk controller 24 performs signal processing, like affixing ECC data on the input data sector by sector, and sends the processed data to the signal processing circuit 23 byte by byte. The signal processing circuit 23 executes signal processing such as coding on each byte of input data, affixes servo information to the processed data, converts the resultant data to serial data, and sends it out as an analog signal. This analog signal is amplified by the amplifier 3 to be written on the disk 1 by the head 2.

The servo information added by the signal processing circuit 23 is used for the servo control of the head 2 and for reading data. Specifically, based on the servo information recorded on the disk 1, the signal processing circuit 23 generates a reference clock signal for synchronizing the rotation of the disk 1 with the data reading timing and detects the position at which data reading starts.

The hard disk controller 24 detects the position of the head 2 based on the servo information in the data, which is sent via the bus 26 from the signal processing circuit 23. The hard disk controller 24 sends control data via the bus 26 to the position controller 25 to locate the head 2 at a position corresponding to the desired target track for data reading or writing. Based on the input control data, the position controller 25 controls an actuator, such as a motor (not illustrated), to control the positioning of the head 2.

Figure 5:
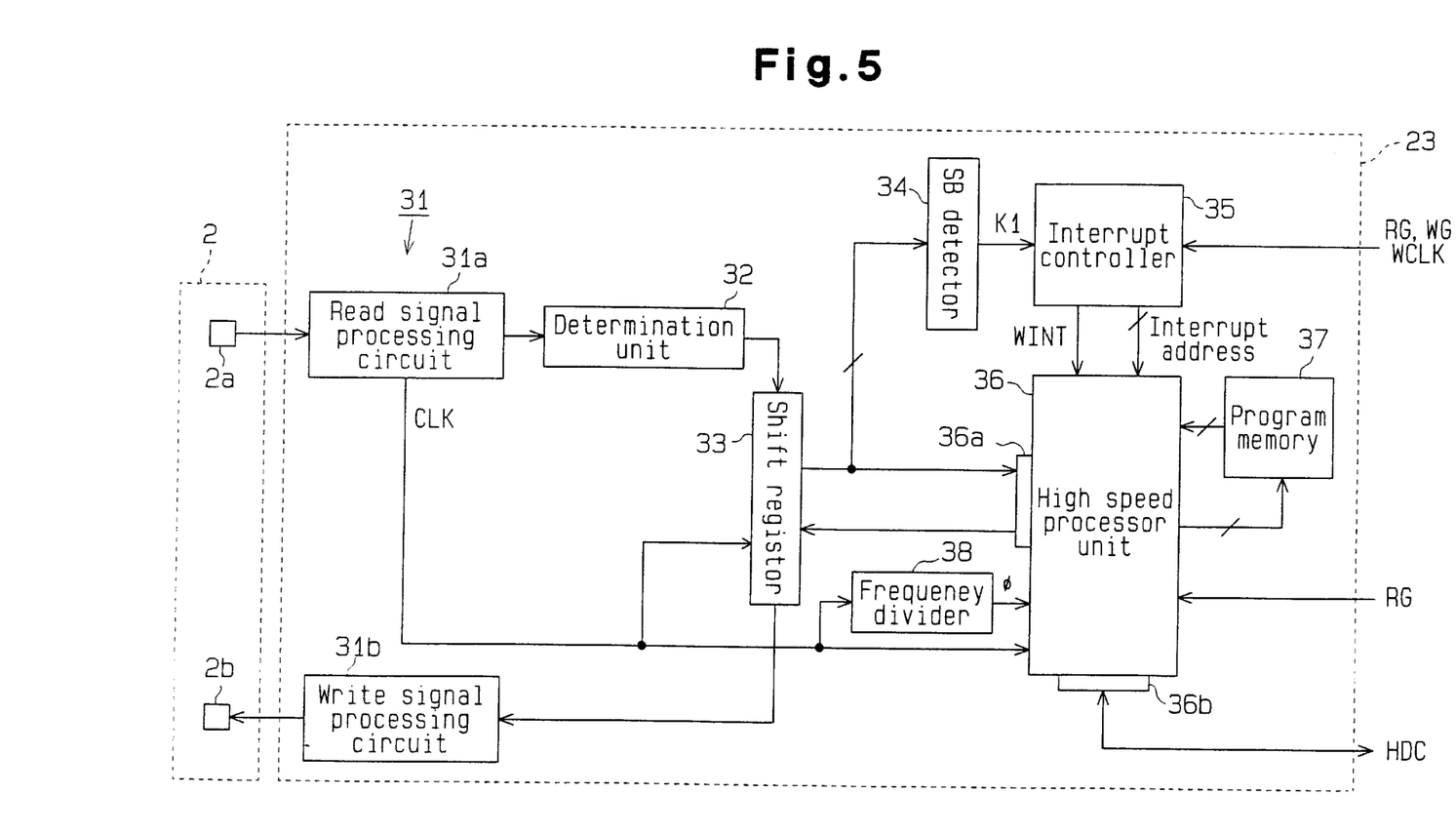
FIG. 5 is a block diagram of a signal processing circuit according to this embodiment.

As shown in FIG. 5, the signal processing circuit 23 receives a read gate signal RG and a write gate signal WG as control signals from the hard disk controller 24 via the bus 26. The signal processing circuit 23 also receives a write clock signal WCLK from the hard disk controller 24. In FIG. 5, the amplifier 3 located between the head 2 and the signal processing circuit 23 is omitted.

The read gate signal RG and the write gate signal WG are used to set the operation mode of the signal processing circuit 23 in either the read mode or the write mode. When receiving the read gate signal RG, the signal processing circuit 23 enters the read mode to perform a reading operation. In the read mode, a serial analog signal read from the disk 1 by a read head 2a is converted to a parallel digital signal, which is in turn sent out. When receiving the write gate signal WG, the signal processing circuit 23 enters the write mode to perform a writing operation. In the writing operation, a parallel digital signal input from the hard disk controller 24 is converted to a serial analog signal, which is in turn sent out. The analog signal output in this writing operation is written on the disk 1 by a write head 2b.

The reading operation and the circuit that executes the reading operation will now be described in detail.

Data recorded on the disk 1 is read by the read head 2a and is input to the converter 31 of the signal processing circuit 23. The converter 31 comprises a read signal processing circuit 31a and a write signal processing circuit 31b. The read signal processing circuit 31a is used at the time of reading data, while the write signal processing circuit 31b is used at the time of writing data.

The read signal processing circuit 31a performs processing, such as filtering or wave shaping, on the analog signal read by the read head 2a and sends the processed analog signal to a determination unit 32. The read signal processing circuit 31a incorporates a PLL circuit, which generates a clock signal CLK synchronous with the input analog signal.

The determination unit 32 converts the analog signal, which is output from the read signal processing circuit 31a, to a serial digital signal (serial data) of "0" or "1" according to a predetermined manner, such as peak detection, and sequentially sends the digital signal to the shift register 33.

The shift register 33 receives the clock signal CLK generated by the read signal processing circuit 31a in addition to the digital signal converted by the determination unit 32. In synchronism with the clock signal CLK, the shift register 33 converts the serial digital signal sequentially coming from the determination unit 32 to parallel data having a predetermined number of bits that form one byte, and then it sends the parallel data to a sync byte (SB) detector 34 and a high speed processor unit (hereinafter simply called"processor") 36.

The SB detector 34, in which a predetermined pattern has been previously stored, compares this pattern with 1-byte data coming from the shift register 33. When the read data matches that pattern, the SB detector 34 determines that the read data is a sync byte and sends an SB detection signal K1 to an interrupt controller 35.

In addition to the SB detection signal K1, the interrupt controller 35 receives the read gate signal RG, the write gate signal WG and the write clock WCLK as control signals from the hard disk controller 24.

Figure 6:
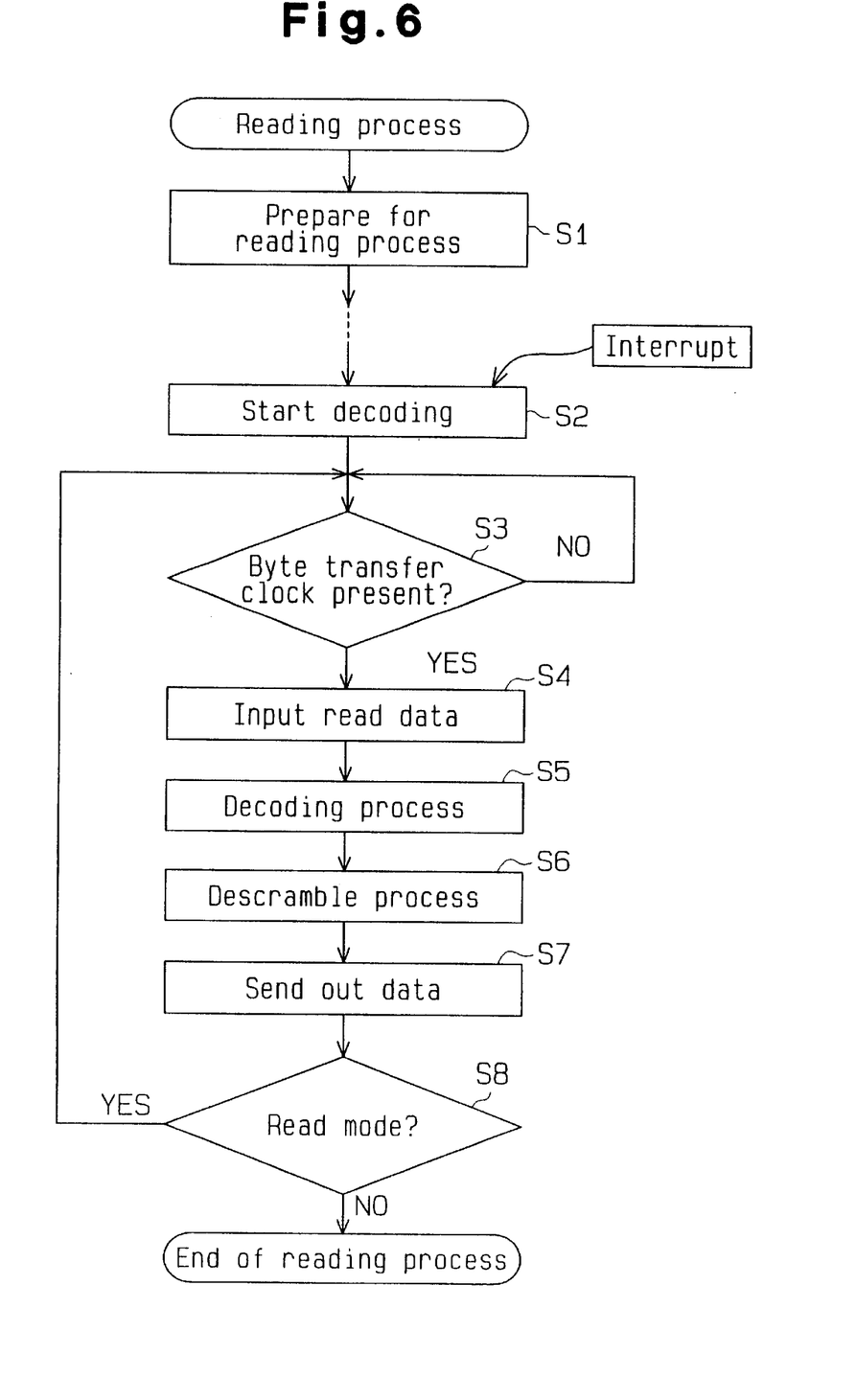
FIG. 6 is a flowchart illustrating a reading operation.

When set to the read mode in response to the read gate signal RG, the interrupt controller 35 sets an interrupt address for the reading operation in the processor 36. Connected to the processor 36 is the program memory (hereinafter simply called"memory") 37 in which the read program for executing a reading operation from steps S1 to S8, as shown in FIG. 6, is stored. Steps S2–S8 are an interrupt program. The interrupt address corresponds to the address of step S2 in the program.

The processor 36 operates faster than access to the disk 1, i.e., the time during which data is read from the disk 1 by the read head 2a. When the read gate signal RG is input to the processor 36, this processor 36 is set to the read mode and prepares for the reading process in step S1.

When receiving the SB detection signal K1, the interrupt controller 35 sends an interrupt signal to the processor 36. In response to this interrupt signal, the processor 36 executes the read program from steps S2–S8 shown in FIG. 6, step by step, to perform the reading operation of the input data.

Specifically, the processor 36 starts decoding parallel data input from the shift register 33 in step S2. In step S3, the processor 36 determines the presence or absence of a byte transfer clock. The byte transfer clock is a frequency-divided clock signal $\phi$ obtained by frequency-dividing the clock signal CLK, generated by the read signal processing circuit 31a, by a predetermined frequency-dividing ratio by a frequency divider 38 connected to the processor 36. The frequency-dividing ratio of the frequency divider 38 corresponds to the number of bits of one byte built up by the shift register 33. The shift register 33 sequentially receives serial digital data in synchronism with the clock signal CLK and sends out 1-byte parallel data having a plurality of bits.

When one byte consists of eight bits, for example, every time 8-bit serial digital data is input to the shift register 33, 1-byte digital data is output from the shift register 33. Therefore, the processor 36 receives 1-byte digital data in synchronism with the frequency-divided clock signal $\phi$, which is obtained by dividing the clock signal CLK by eight.

When the frequency-divided clock signal $\phi$ serving as the byte transfer clock is input to the processor 36 in step S3, the processing proceeds to step S4 where the processor 36 receives parallel data from the shift register 33. In step S5, the processor 36 performs a decoding process on the input parallel data according to a predetermined manner, and then proceeds to step S6.

The step S6 is a descramble process in which the processor 36 performs the same descramble process as done in the prior art on the data decoded in step S5 to descramble the input data. The descrambling of data is performed to positively generate the clock signal CLK in the PLL circuit in the read signal processing circuit 31a as in the prior art. When the process in step S6 is finished, the processor 36 goes to step S7.

The step S7 is a data outputting process in which the processor 36 sends out the parallel data, which was descrambled in step S6, on the bus 26 via a parallel port 36b. The data output on the bus 26 is sequentially input to the hard disk controller 24 shown in FIG. 4. The sequence of processes from the data input in step S4 to the data output in step S7 allows one byte of parallel data to be sent to the hard disk controller 24.

The hard disk controller 24 assembles the input parallel data into data in the units of sectors, each of which has a predetermined number of bytes, and performs a process like error correction or the like on the assembled data sector by sector. Then, the hard disk controller 24 converts the processed data based on a predetermined communication manner and sends the resultant data to the micoro processor.

In the next step S8, the processor 36 determines whether it is in the read mode. This determination is made based on the read gate signal RG input from the hard disk controller 24. While the read mode is set on the basis of the read gate signal RG, the processor 36 executes processes in steps S5 and S6 for each byte of the input parallel data and sequentially sends the resultant data to the hard disk controller 24.

Figure 7:
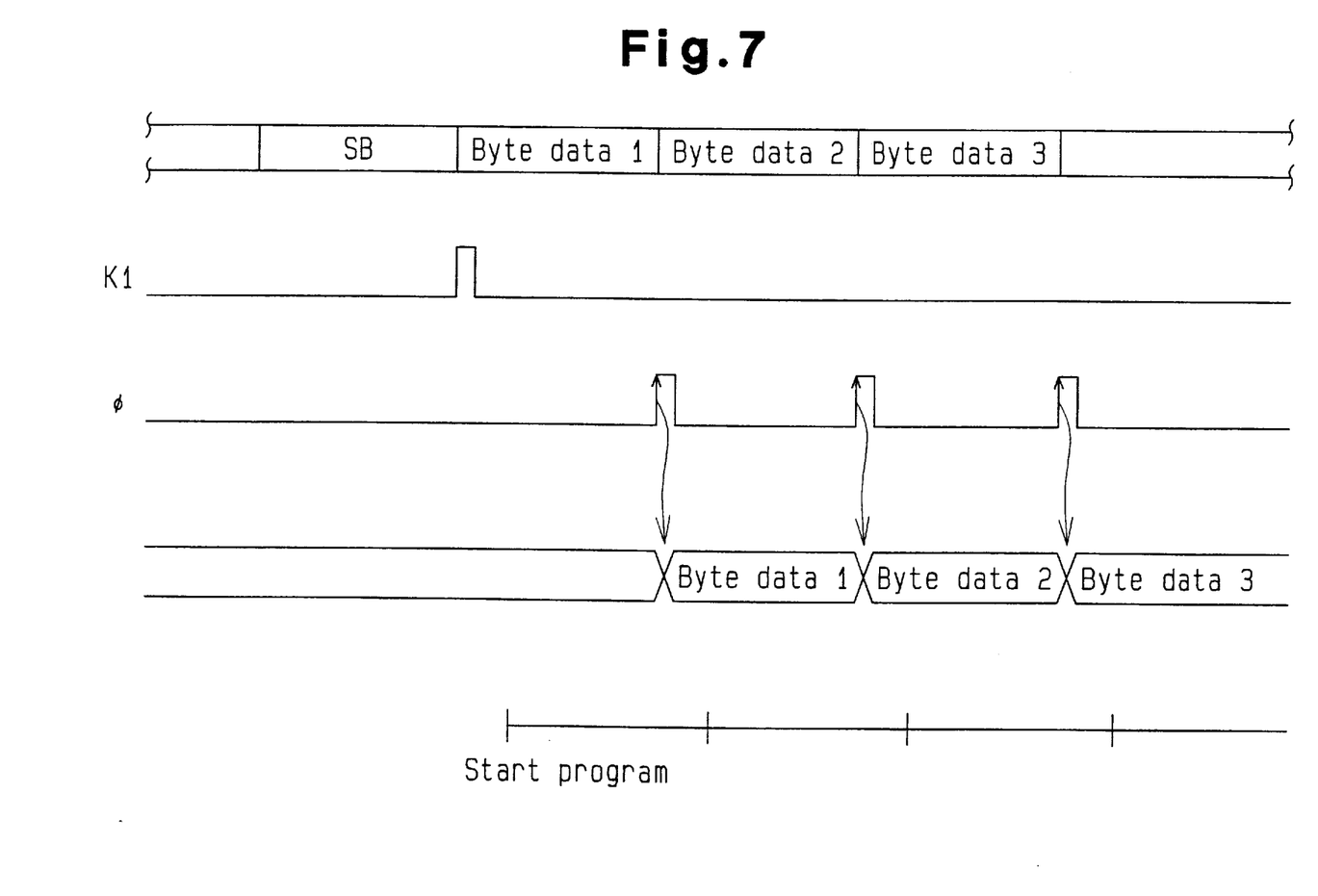
FIG. 7 is a timing chart for the reading operation.

In the read mode, as shown in FIG. 7, the processor 36 executes the read program to perform the reading operation based on the SB detection signal K1, which is indicative of the presence of the sync byte SB. Then, the processor 36 sequentially processes 1-byte data input in synchronism with the byte transfer clock (the frequency-divided clock signal $\phi$) and sends out the resultant data. The processor 36 operates faster than access to the disk 1, i.e., the time during which data is read from the disk 1 by the read head 2a. Therefore, the sequence of processes from steps S4 to S7 by the processor 36 is completed until the next input of the byte transfer clock (frequency-divided clock signal $\phi$).

When the read mode is discontinued based on the read gate signal RG in step S8, the processor 36 terminates the reading operation.

A writing operation and the circuit that executes the writing operation will be discussed below. In writing data on the disk 1, the hard disk controller 24 sends the write gate signal WG to the signal processing circuit 23. When set to the write mode based on the write gate signal WG, the processor 36 of the signal processing circuit 23 prepares for data writing.

Figure 8:
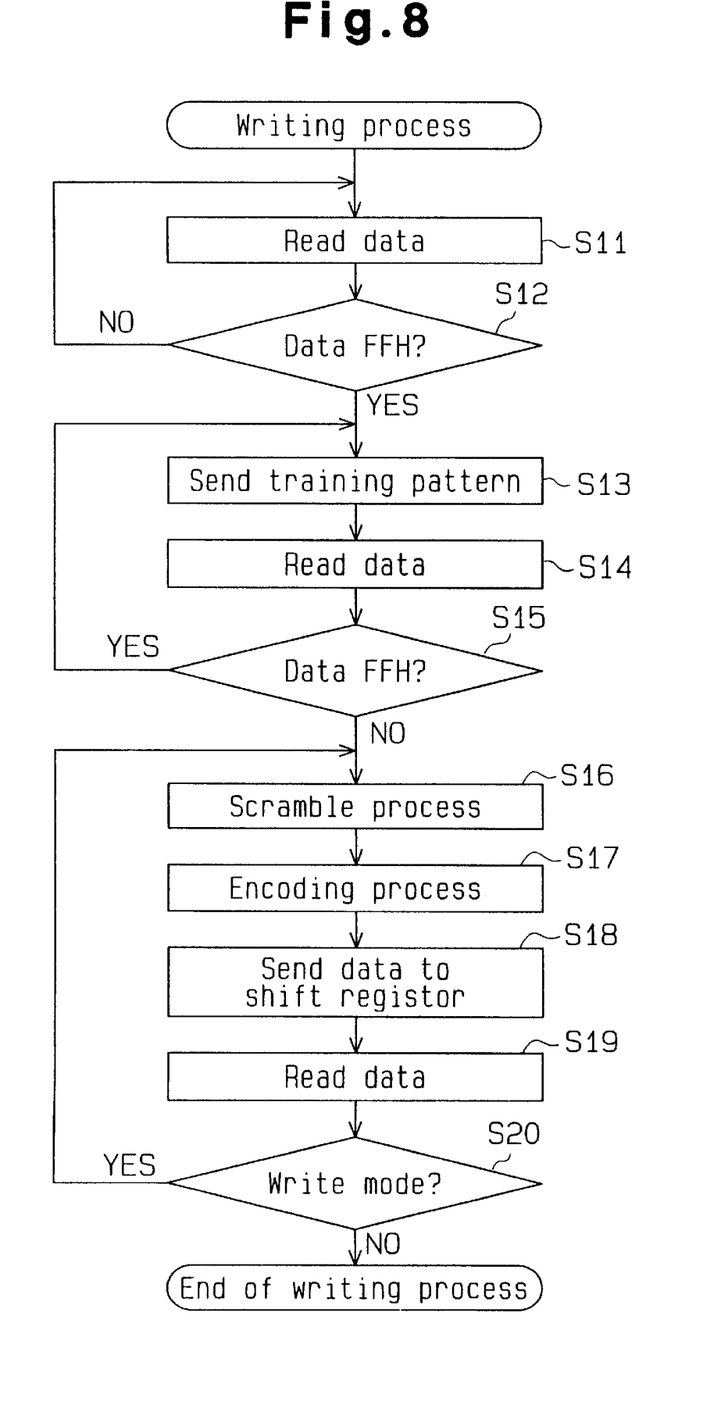
FIG. 8 is a flowchart illustrating a writing operation.

When the mode is set to the write mode based on the write gate signal WG, the interrupt controller 35 of the signal processing circuit 23 sets an interrupt address for the writing operation in the processor 36. The write program for executing the writing operation from steps S11 to S20 has previously been stored in the memory 37, as shown in FIG. 8. The interrupt address corresponds to the address of step S11 in the program.

Figure 9:
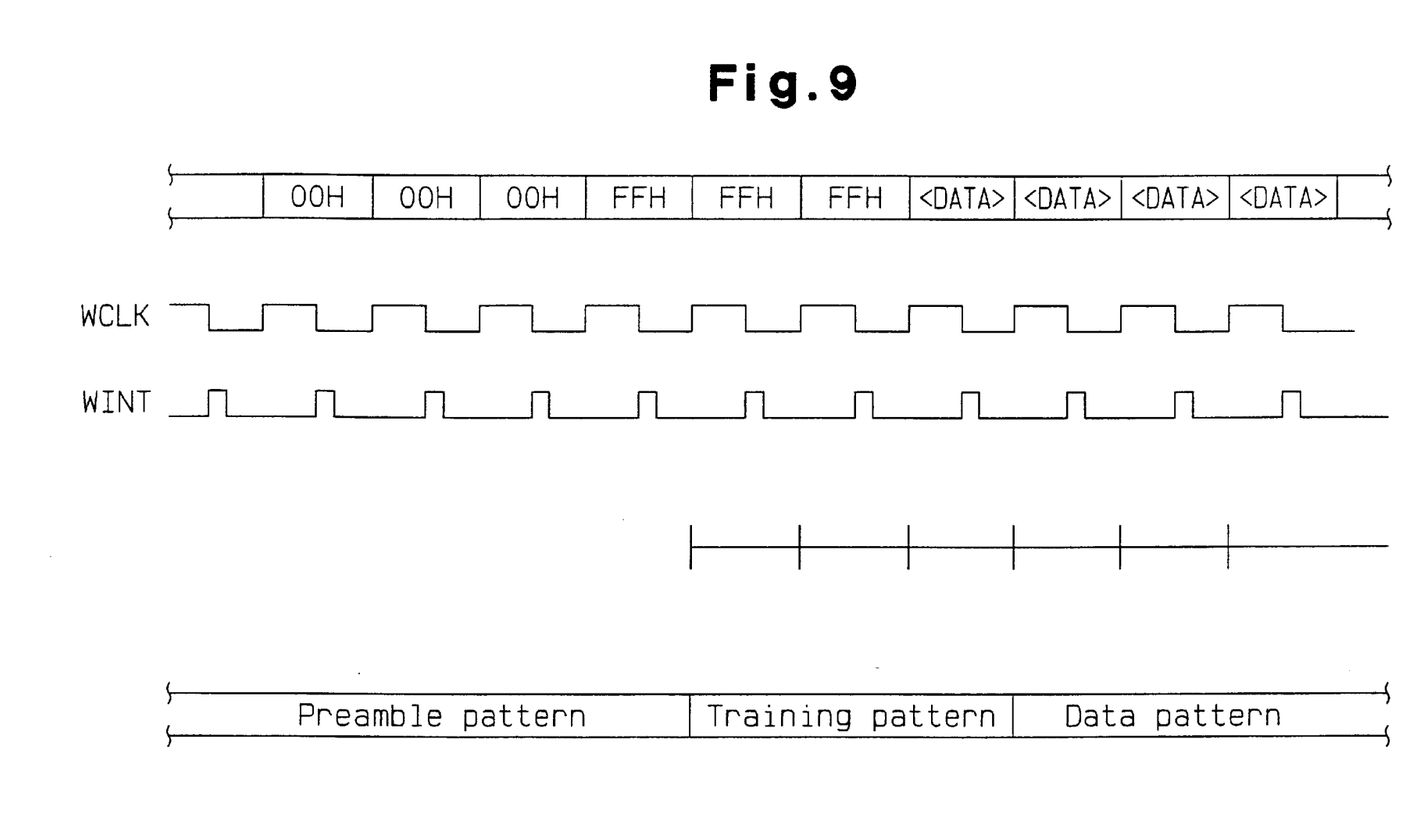
FIG. 9 is a timing chart for the writing operation.

Because the write clock signal WCLK is input to the interrupt controller 35, the interrupt controller 35 generates an interrupt signal WINT that is synchronism with the write clock signal WCLK and sends it to the processor 36, as shown in FIG. 9. Every time the interrupt signal WINT is sent from the interrupt controller 35, the processor 36 performs an interrupt operation and executes the interrupt program from steps S11 to S20. In this interrupt program, the processor 36 determines whether the input data from the hard disk controller 24 should be written in the sync area (SB) or in the data area, both shown in FIG. 10, and sends the data to the shift register 33 in accordance with the determination result.

Specifically, first, the processor 36 reads parallel data, which has been sent on the bus 26 from the hard disk controller 24 and should be written on the disk 1, in step S11. In step S12, the processor 36 determines whether the read data is"FFH".

In writing data on the disk 1, as shown in FIG. 9, the hard disk controller 24 sends data in synchronism with the write clock signal WCLK. This data includes a predetermined number of pieces of data"00H" (hexadecimal code) output first, a predetermined number of pieces of data "FFH" (three pieces in FIG. 9) output next, and data <DATA> output thereafter.

The data"00H" corresponds to the preamble pattern in the sync area in the format that is recorded on the disk 1, and the data"FFH" corresponds to the training pattern in the sync area. Therefore, the signal processing circuit 23 writes the preamble pattern on the disk 1 while the data "00H" is input and writes the training pattern on the disk 1 while the data"FFH" is input. When the data "FFH" ends, the signal processing circuit 23 writes the sync byte SB at the end of the training pattern and then sequentially writes the data <DATA> on the disk 1.

Until the data"FFH" is input, therefore, the processor 36 repeats steps S11 and S12. During this period, the write signal processing circuit 31b sends a periodic analog signal to the write head 2b to write the periodic preamble pattern on the disk 1.

When the data "FFH" is input, the processor 36 moves to step S13 from step S12 and sends the training pattern to the shift register 33. The shift register 33 converts the parallel data of the input training pattern to serial data and sends the serial data to the write signal processing circuit 31b. The write signal processing circuit 31b sequentially converts the input serial data to an analog signal and sends it to the write head 2b. Based on this analog signal, the training pattern is recorded on the disk 1.

Then, the processor 36 receives the next data in step S14 and determines whether the input data is "FFH" in step S15. When the input data is"FFH", the processor 36 returns to step S13 and sends out the training pattern.

When it is not determined in step S15 that the data input in step S14 is"FFH", the processor 36 proceeds to step S16 from step S15. The step S16 is a scramble process in which the processor 36 scrambles the input data in a predetermined manner such that serial data converted from the input data does not have consecutive bits of"0" or "1", and then the processor goes to step S17.

The step S17 is an encoding process in which the processor 36 encodes the data, scrambled in steps S16, in a predetermined manner. In step S18, the processor 36 sends one byte of encoded data to the shift register 33.

The shift register 33 converts the input 1-byte data to serial data, which is in turn sent to the write signal processing circuit 31b. The write signal processing circuit 31b sequentially converts the input serial data to an analog signal and sends it to the write head 2b. Based on that analog signal, data is sequentially written on the disk 1.

When sending the data to the shift register 33 in step S18, the processor 36 proceeds from step S18 to step S19 to receive the next data. When receiving the next data, the processor 36 determines in step S20 whether it is in the write mode. This determination is made on the basis of the write gate signal WG input from the hard disk controller 24. In other words, while the write mode is set based on the write gate signal WG, the processor 36 executes the processes in steps S16 and S17 for each byte of the input parallel data and sequentially sends the processed data to the shift register 33.

Until the data "FFH" is detected, the processor 36 writes the preamble pattern on the disk 1, as shown in FIG. 9. When detecting the data "FFH", the processor 36 writes the training pattern on the disk 1. When receiving the data <DATA> to be written, the processor 36 sequentially processes the input data and sends the processed data to the shift register 33. The processor 36 operates faster than the access to the disk 1, i.e., the time during which data is written on the disk 1 by the write head 2b. Therefore, the sequence of processes in steps S16–S20 by the processor 36 is completed until the next data <DATA> is input.

When the write mode is discontinued based on the write gate signal WG in step S20, the processor 36 stops sending data to the shift register 33 and terminates the writing operation.

A user may change the format of data to be recorded on the disk 1, e.g., the encoding/decoding system. In this case, the alteration of the format can easily be achieved by changing (a) the decoding process in step S5 in the read program stored in the memory 37, (b) the encoding process in step S17 in the write program, (c) the descramble process in step S6 in the read program, and (d) the scramble process in step S16 in the write program according to this embodiment.

Further, the alteration of the format can easily be achieved by previously storing programs associated with a plurality of formats in the memory 37 and changing the interrupt address to be set in the processor 36 by the interrupt controller 35 as needed.

According to this embodiment, data is processed using the high speed processor 36. Therefore, the decoder 9, descrambler 11, scrambler 15 and encoder 16 in the prior art can be replaced with the single processor 36. Further, the conventional S/P converter 8 and P/S converter 17 can be replaced with the single shift register 33. Those features make the circuit scale of the signal processing circuit 23 smaller than that of the conventional signal processing circuit 3, so that the disk apparatus is more compact.

This invention is not limited to the above-described embodiment but may be embodied in the following forms without departing from the spirit or scope of the invention.

Although the signal processing ci~cuit 23 and the hard disk controller 24 are formed of separate chips in this embodiment, both circuits 23 and 24 may be formed on the same chip. In this case, the bus 26 should be also formed on that chip.

Although the determination unit 32 in the signal processing circuit 23 converts an analog signal to a digital signal by peak detection in this embodiment, other systems like PRML (Partial Response Maximum Likelihood) system may be used as well for the analog-to-digital conversion.

In this embodiment, the interrupt controller 35, the processor 36 and the memory 37 are structured individually. However, the interrupt controller 35 and the processor 36, or the processor 36 and the memory 37, or the interrupt controller 35, the processor 36 and the memory 37 may be combined, and are designed as an integrated circuit.

In this embodiment, a buffer memory may be provided between the signal processing circuit 23 and the hard disk controller 24 to effect buffering of parallel data that is transferred between both circuits 23 and 24.

I claim:

1. A signal processing circuit for converting a serial analog signal, obtained by sequentially reading data recorded on a disk by a head, to a parallel digital signal to be output, for converting an externally input parallel digital signal to a serial analog signal at the time of recording data on the disk, and for outputting the analog signal to the head, the signal processing circuit comprising:

a converter for converting the serial analog signal of data read from the disk to a serial digital signal and for converting the parallel digital signal of externally input data to an analog signal in order to send the analog signal to the head;

a shift register for converting the serial digital signal received from the converter to a parallel digital signal in a data read mode and for converting the parallel digital signal externally input to a serial digital signal to send the serial digital signal to the converter in a data write mode;

a processor for operating faster than a disk access speed to perform a predetermined reading process on the parallel digital signal received from the shift register for sending the resultant read signal and for operating faster than the disk access speed to perform a predetermined writing process on the parallel digital signal externally input for sending the resultant write signal to the shift register; and a program memory, connected to the processor, for storing programs associated with the reading process and writing process that are performed by the processor.

2. The signal processing circuit according to claim 1, wherein the disk has a data area for storing data and a synchronization byte indicative of an initial end of the data area.

3. The signal processing circuit according to claim 2 further comprising:

a synchronization byte detector for detecting the synchronization byte in the digital signal output from the shift register in the data reading mode and for transmitting a detection signal when detecting the synchronization byte;

an interrupt controller for receiving the detection signal transmitted from the synchronization byte detector, said interrupt controller interrupting the process performed by the processor in response to the detection signal; and wherein the processor performs the reading process according to the interruption by the interrupt controller.

4. The signal processing circuit according to claim 3, wherein the interrupt controller receives a write clock signal externally in the data writing mode and, in synchronism with the write clock signal, performs the interruption to the process by the processor, and wherein the processor sends the data processed with the writing process to the shift register according to the interruption.

5. The signal processing circuit according to claim 1, wherein the converter includes:

a read signal processing circuit for converting the analog signal received from the head to the digital signal to send the digital signal to the shift register in the data reading mode; and a write signal processing circuit for converting the digital signal received from the shift register to the analog signal to send the analog data to the head in the data writing mode.

6. The signal processor according to claim 5, wherein the disk has a data area for storing data and a synchronization byte indicative of an initial end of the data area.

7. The signal processing circuit according to claim 6 further comprising:

a synchronization byte detector for detecting the synchronization byte in the digital signal output from the shift register in the data reading mode and for transmitting a detection signal when detecting the synchronization byte;

an interrupt controller for receiving the detection signal transmitted from the synchronization detector, said interrupt controller interrupting the process performed by the processor in response to the detection signal; and wherein the processor performs the reading process according to the interruption by the interrupt controller.

8. The signal processing circuit according to claim 7, wherein the interrupt controller receives a write clock signal externally in the data writing mode and, in synchronism with the write clock signal, performs the interruption to the process by the processor, and wherein the processor sends the data processed with the writing process according to the interruption to the shift register.

9. A semiconductor signal processing unit having the signal processing circuit according to claim 1, wherein the signal processing circuit is comprised of a one chip semiconductor device and transmits the reading data in byte units, and wherein the semiconductor signal processing unit includes:

a disk controller for building up sector data from byte data transmitted from the signal processing circuit, for processing the sector data to transmit the sector data externally, and for processing the digital signal of externally input data in sector units in the data writing mode to send the digital signal in byte units, said disk controller being comprised of a one chip semiconductor device;

a board for mounting the signal processing circuit and the disk controller; and a bus provided on the board for connecting the signal processing circuit and the disk controller.

10. The semiconductor signal processing unit according to claim 9, wherein the disk has a data area for storing data and a synchronization byte indicative of an initial end of the data area.

11. The semiconductor signal processing unit according to claim 10 further comprising:

a synchronization byte detector for detecting the synchronization byte in the digital signal output from the shift register in the data reading mode and for transmitting a detection signal when detecting the synchronization byte;

an interrupt controller for receiving the detection signal transmitted from the synchronization detector, said interrupt controller interrupting the process performed by the processor in response to the detection signal; and wherein the processor performs the reading process according to the interruption by the interrupt controller.

12. The semiconductor signal processing unit according to claim 11, wherein the interrupt controller receives a write clock signal externally in the data writing mode and, in synchronism with the write clock signal, performs the interruption to the process by the processor, and wherein the processor sends the data processed with the writing process according to the interruption to the shift register.

13. A disk unit having the signal processing circuit according to claim 1, wherein the signal processing circuit transmits the reading data in byte units, and wherein the signal processing circuit includes a disk controller for building up sector data from byte data transmitted from the signal processing circuit, for processing the sector data to transmit the sector data externally, and for processing the digital signal of externally input data in sector units in the data writing mode to send the digital signal in byte units.

14. The disk unit according to claim 13, wherein the disk has a data area for storing data and a synchronization byte indicative of an initial end of the data area.

15. The disk unit according to claim 14 further comprising:

a synchronization byte detector for detecting the synchronization byte in the digital signal output from the shift register in the data reading mode and for transmitting a detection signal when detecting the synchronization byte;

an interrupt controller for receiving the detection signal transmitted from the synchronization detector, said interrupt controller interrupting the process performed by the processor in response to the detection signal; and wherein the processor performs the reading process according to the interruption by the interrupt controller.

16. The disk unit according to claim 15, wherein the interrupt controller receives a write clock signal externally in the data writing mode and, in synchronism with the write clock signal, performs the interruption to the process by the processor, and wherein the processor sends the data processed with the writing process to the shift register according to the interruption.

* * * * *